I. P. WENDELL.
Car-Axle Box.
No. 58,927.
Patented Oct. 16, 1866.
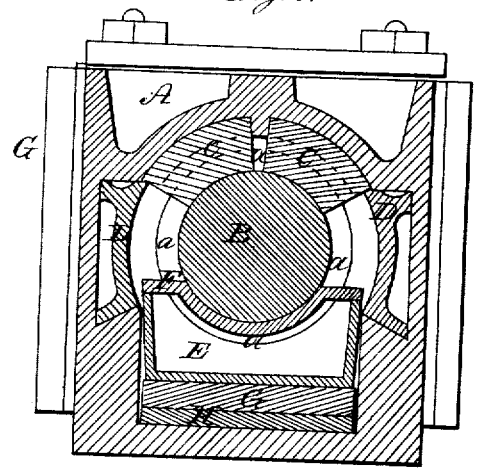
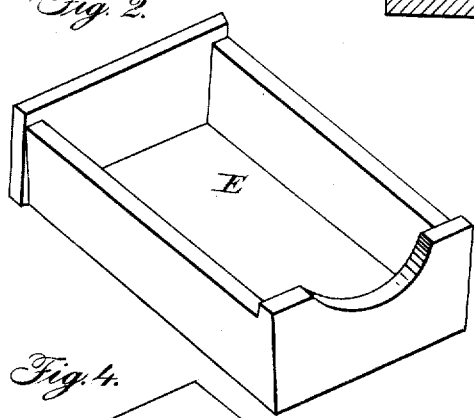
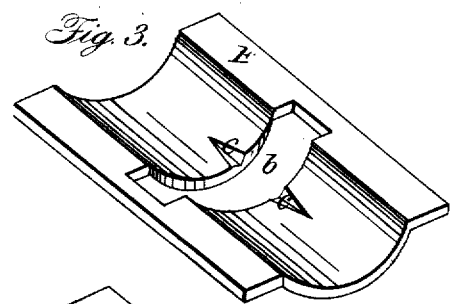
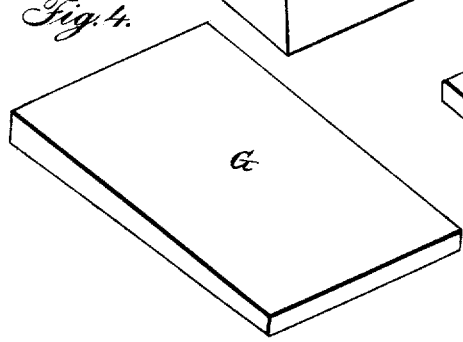
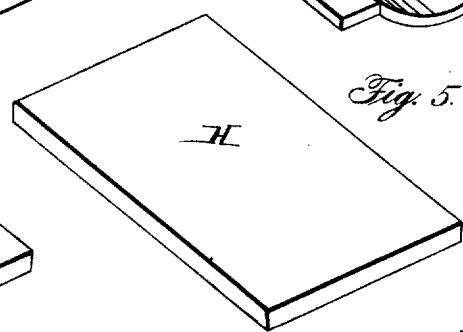
Witnesses:
Inventor:
Isaac P. Wendell

UNITED STATES PATENT OFFICE.

ISAAC P. WENDELL, OF PHILADELPHIA, PENNSYLVANIA.

IMPROVED RAILROAD-CAR BOX.

Specification forming part of Letters Patent No. 58,927, dated October 16, 1866.

*To all whom it may concern:*

Be it known that I, ISAAC P. WENDELL, of the city and county of Philadelphia, and State of Pennsylvania, have invented a new and useful Improvement in Journal-Boxes for Railroad-Cars; and I do hereby declare that the following is a full, clear, and exact description of the construction and operation of the same, reference being had to the annexed drawings, making a part of this specification, in which—

Figure 1 is a vertical cross-section of the box. Fig. 2 is a perspective view of the oil-box E. Fig. 3 is a perspective view of the lower bearing, F. Fig. 4 is a perspective view of the elevating-wedge G. Fig. 5 is a perspective view of the elastic support H.

Like letters in all the figures indicate the same parts.

The nature of my invention will be understood by the following description.

A is the box, the exterior of which is like that of an ordinary car-box. B is the journal of a shaft, which has a collar, a, for supplying the bearings with oil. C C are brass bearings on the upper side of the journal, which are supported by side keys, D D.

As all of the above-described parts are embraced in a former patent, I deem a particular description unnecessary.

E is a cast-iron box for containing the oil by which the bearings are lubricated, for a detailed representation of which see Fig. 2.

The curved plate F, which is shown in detail in Fig. 3, is an under bearing for the journal B. It is supported by the longitudinal edges of the box E.

There is a cross-opening, b, in the plate, through which the lubricating-collar a of the journal turns freely. The said plate, besides constituting an under bearing for the journal, serves to conduct the waste oil back into the box E, there being descending grooves c c, through which it runs; besides, the under side of the plate serves to keep the oil in the box from being thrown up by the motion of the car.

G is a wedge for raising the box E to its position, as seen in Fig. 1, and keeping the under bearing, F, up against the journal B, it being necessary to have the space the wedge occupies in Fig. 1, so as to slide the box beneath the journal, so that its inner end may clear the lubricating-collar a.

H is a flat piece of india-rubber, placed beneath the wedge G, for the purpose of keeping the under bearing, F, at all times up against the journal B, it acting as a spring, so as to compensate for the wearing of the journal and bearings. Instead of india-rubber, steel springs or other elastic support may be used.

The operation is as follows: The box E being supplied with oil, as the journal B revolves, the collar a takes up a sufficient quantity of oil to thoroughly lubricate the upper bearings, C C, and lower bearing, F, which is distributed upon the bearings by the journal, after it runs upon the same, from said collar, and the excess or waste oil runs from the bearing F, by means of the descending grooves c c, back into the oil-box E, perpetually, as the journal revolves and the bearings are lubricated.

Having thus fully described my improvement in car-boxes, what I claim therein as new, and desire to secure by Letters Patent, is—

1. The combination of the oil-box E with the box A and journal B, arranged and operating substantially as described.

2. The combination and arrangement of the curved plate F with the oil-box E and journal B, substantially as described, so as to answer the triple purpose of an under bearing for the journal, conducting the waste oil back into the oil-box, and serving as a cover to said box to keep the oil in place, as specified.

3. The combination of the wedge G with the box A and oil-box E, substantially in the manner described, and for the purpose set forth.

4. The elastic support H, combined and arranged with oil-box E and box A, substantially in the manner described and for the purpose set forth.

In testimony that the above is my invention I have hereunto set my hand and affixed my seal this 12th day of October, 1865.

ISAAC P. WENDELL. [L. S.]

Witnesses:
 STEPHEN USTICK,
 F. B. MORRIS.